US010164703B2

(12) United States Patent
Peragin

(10) Patent No.: US 10,164,703 B2
(45) Date of Patent: Dec. 25, 2018

(54) ARCHITECTURE FOR OBSERVING A PLURALITY OF OBJECTS ARRANGED IN GEOGRAPHICALLY SEPARATE LOCATIONS AND METHOD OF COLLECTING THE ASSOCIATED OBSERVATION DATA

(71) Applicant: CENTRE NATIONAL D'ETUDES SPATIALES, Paris (FR)

(72) Inventor: Eric Peragin, Ramonville (FR)

(73) Assignee: CENTRE NATIONAL D'ETUDES SPATIALES, Paris (FR)

( * ) Notice: Subject to any disclaimer, the term of this patent is extended or adjusted under 35 U.S.C. 154(b) by 167 days.

(21) Appl. No.: 15/511,972

(22) PCT Filed: Sep. 25, 2015

(86) PCT No.: PCT/EP2015/072164
§ 371 (c)(1),
(2) Date: Mar. 16, 2017

(87) PCT Pub. No.: WO2016/046395
PCT Pub. Date: Mar. 31, 2016

(65) Prior Publication Data
US 2017/0294956 A1    Oct. 12, 2017

(30) Foreign Application Priority Data
Sep. 26, 2014    (FR) .................... 14 59153

(51) Int. Cl.
*H04B 7/185*    (2006.01)
*H04Q 9/00*    (2006.01)

(52) U.S. Cl.
CPC .......... *H04B 7/18504* (2013.01); *H04Q 9/00* (2013.01); *H04Q 2209/10* (2013.01);
(Continued)

(58) Field of Classification Search
CPC ... H04B 7/18504; H04Q 9/00; G04A 2209/10
See application file for complete search history.

(56) References Cited

U.S. PATENT DOCUMENTS

| 4,962,488 A | 10/1990 | Robert et al. |
| 6,240,369 B1* | 5/2001 | Foust ................ G01W 1/00 342/26 R |
| 2003/0184545 A1* | 10/2003 | Ohto ................ G06K 9/0063 345/419 |

FOREIGN PATENT DOCUMENTS

| WO | 01/78025 A2 | 10/2001 |
| WO | 2007/064655 A1 | 6/2007 |

OTHER PUBLICATIONS

International Search Report, dated Jan. 12, 2016, from corresponding PCT application.
(Continued)

*Primary Examiner* — Arvin Eskandarnia
(74) *Attorney, Agent, or Firm* — Burris Law, PLLC

(57) ABSTRACT

Disclosed is an architecture for observing a plurality of objects arranged in geographically separate locations, including: a processing center connected to a global computer network, and at least one airliner. The at least one airlines includes: a cabin system including a local network, a first external communication module, a second external communication module, and an intermediate communication module connected to the first external communication module by the local network and to the second external communication module by the local network, the intermediate communication module communicating digital data including observation data between the second external communication module and the first external communication module via the local network.

15 Claims, 3 Drawing Sheets

(52) U.S. Cl.
CPC ..... *H04Q 2209/25* (2013.01); *H04Q 2209/40* (2013.01); *H04Q 2209/50* (2013.01); *H04Q 2209/883* (2013.01)

(56) References Cited

OTHER PUBLICATIONS

International Search Report, dated Jul. 21, 2015, from corresponding PCT application.

* cited by examiner

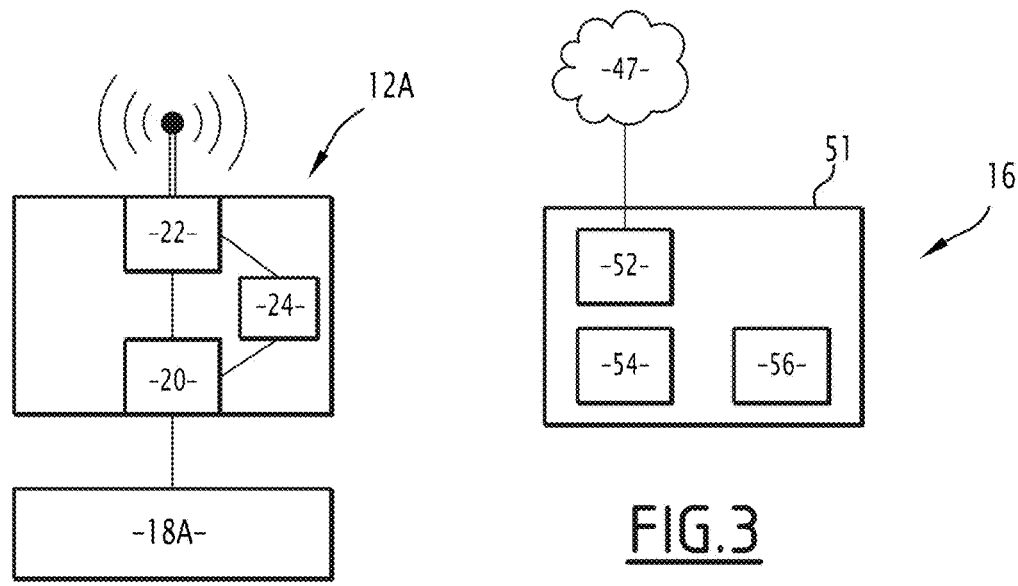
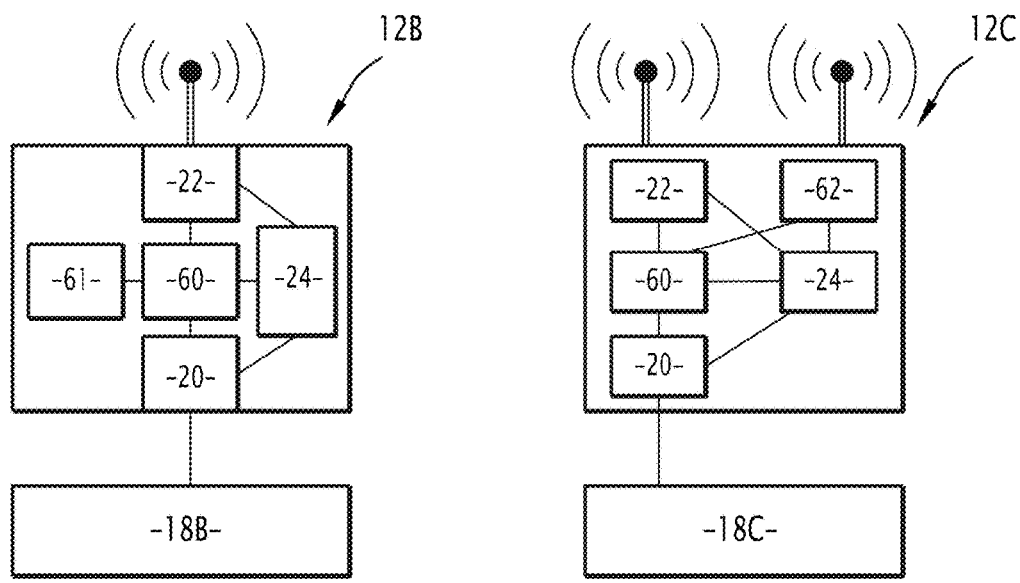

ARCHITECTURE FOR OBSERVING A PLURALITY OF OBJECTS ARRANGED IN GEOGRAPHICALLY SEPARATE LOCATIONS AND METHOD OF COLLECTING THE ASSOCIATED OBSERVATION DATA

FIELD OF INVENTION

The present invention relates to an architecture for observing a plurality of objects arranged in geographically separate locations.

Such an observation architecture in particular makes it possible to collect observation data relative to objects separated from a center for processing this data and optionally located in geographical locations that are difficult to access by other wireless or computer link means.

Each object comprises any living or nonliving object whereof remote observation is of interest for scientific, commercial, military, etc. purposes.

Such an object is for example an animal of an endangered species moving in a predetermined geographical zone. Observing this animal may then comprise analyzing geographical coordinates of its movements, or its body temperature.

Another example of such an object is a predetermined zone in the soil whose moisture is observed for agricultural purposes, in particular for appropriate watering of the plants grown in that zone.

According to still another example, such an object is a gas, electricity or water meter that is read remotely.

BACKGROUND OF THE INVENTION

In the state of the art, different observation architectures exist making it possible to collect observation data relative to these objects.

To that end, it is known to use electronic beacons associated with each of these objects and making it possible to generate and send the processing center the observation data related to each of the objects.

In general, this data is sent to the processing center via radio signals in a predetermined bandwidth, in particular using low-orbit satellites. This is in particular the case for observation architectures of the ARGOS type.

Thus, for this type of architecture, each electronic beacon is provided with a transmitting unit making it possible to send radio signals corresponding to observation data to one or several passing satellites at a frequency comprised in the corresponding bandwidth.

After receiving a radio signal corresponding to this data, the or each satellite resends the collected information to the ground via receiving stations. The data is next conveyed to processing centers by specialized data communication networks or by Internet.

Processing this data generally comprises an initial step for extracting observation data generated by the electronic beacons from the radio signal received and sent by the satellite.

However, this solution has a certain number of drawbacks.

In particular, the radiated power of the radio signals by transmitting units corresponding to the objects must be relatively high for these signals to be able to be detected by the satellite(s) situated at significant altitudes.

To achieve such a transmission power, the transmission units are provided with a relatively powerful power source and an antenna, whose performance is critical.

Furthermore, the coverage zone of the satellite comprises a surface of several thousand square kilometers, which sometimes makes it difficult to extract observation data from a radio signal recovered by this satellite.

Indeed, when the number of electronic beacons in the coverage zone of the satellite exceeds the processing or discrimination capacity of the satellite and/or receiving station, the observation data can no longer be received normally.

The present invention aims to provide an observation architecture resolving these drawbacks.

SUMMARY OF THE INVENTION

To that end, the invention relates to an observation architecture of the aforementioned type, including:
for each object, an electronic beacon including an observation unit able to generate at least one observation datum relative to the corresponding object, and a transmission unit able to send a radio signal corresponding to at least one generated observation datum,
a processing center connected to a global computer network,
at least one airliner, including:
a cabin system including a local network,
a first external communication module able to communicate with the processing center via the global computer network,
a second external communication module defining a visibility domain of the airliner for receiving and/or sending radio signals, and able to receive from at least one electronic beacon found in the visibility domain of the airplane, at least one radio signal corresponding to at least one observation datum, and
an intermediate communication module connected to the first external communication module by the local network and to the second external communication module by the local network, the intermediate communication module communicating digital data comprising observation data between the second external communication module and the first external communication module via the local network.

According to other advantageous aspects of the invention, the observation architecture comprises one or more of the following features, considered alone or according to all technically possible combinations:
the intermediate communication module is able to communicate with the second external communication module to collect each received observation datum, and with the first external communication module to send all of the collected observation data to the processing center via the global computer network.
the airliner further includes a computer, and the intermediate communication module is software able to be executed by the computer.
the cabin system is an in-flight entertainment system, the local network is a local multimedia network able to send multimedia data, and the in-flight entertainment system further includes at least one multimedia terminal connected to the local multimedia network, the intermediate communication module is software able to be executed from the at least one multimedia terminal.
the intermediate communication module is a portable computer including connector technology for connecting to the local network.

the at least one electronic beacon includes a control unit able to control the operation of the transmission unit according to a plurality of predetermined transmission rules.

the at least one electronic beacon further includes a storage unit able to store a passage table comprising at least one time range within which the corresponding electronic beacon is found in the visibility domain of the airliner, the transmission rules comprise sending at least one radio signal corresponding to at least one observation datum in at least one time range determined by the passage table.

the at least one electronic beacon further includes a receiving unit able to receive at least one radio signal corresponding to a transmission setpoint, and the transmission rules comprise sending at least one radio signal corresponding to an observation datum after receiving the transmission setpoint.

the radio signal corresponding to a transmission setpoint is able to be sent by the second external communication module in the visibility domain of the airliner.

the at least one electronic beacon further includes a receiving unit able to receive at least one radio signal corresponding to a control setpoint, and the control unit is able to process the control setpoint received by the receiving unit to modify at least certain transmission rules.

the radio signal corresponding to a control setpoint is able to be sent by the second external communication module in the visibility domain of the airliner.

the architecture includes a communication station able to communicate with a group of electronic beacons to collect observation data generated by each of the electronic beacons in the group, the intermediate communication module being able to communicate with the communication station to collect the observation data collected by the communication station.

the first external communication module is connected to the global computer network via one or several satellites.

each transmission unit is able to send radio signals according to a predetermined transmission protocol according to at least one bandwidth, and at least certain transmission protocols and/or bandwidths used by different transmission units are different.

The invention also relates to a collection method implemented by such an observation architecture as previously described, including the following steps:

the observation unit generates an observation datum from at least one electronic beacon found in the visibility domain of the airliner, the corresponding transmission unit sends at least one radio signal corresponding to the observation datum, the second external communication module receives at least one radio signal, the received radio signal is converted into the corresponding observation datum and the observation datum is sent to the intermediate communication module via the local network, the observation datum is sent to the first external communication module by the intermediate communication module via the local network, and the observation datum is sent to the processing center by the first external communication module via the global computer network.

BRIEF DESCRIPTION OF THE DRAWINGS

These features and advantages of the invention will appear more clearly upon reading the following description, provided solely as a non-limiting example, and done in reference to the appended drawings, in which:

FIGS. 2, 4 and 5 are schematic views of the different example embodiments of the electronic beacons of FIG. 1;

FIG. 3 is a schematic view of the intermediate communication module of FIG. 1.

DETAILED DESCRIPTION OF THE INVENTION

Figure 1:
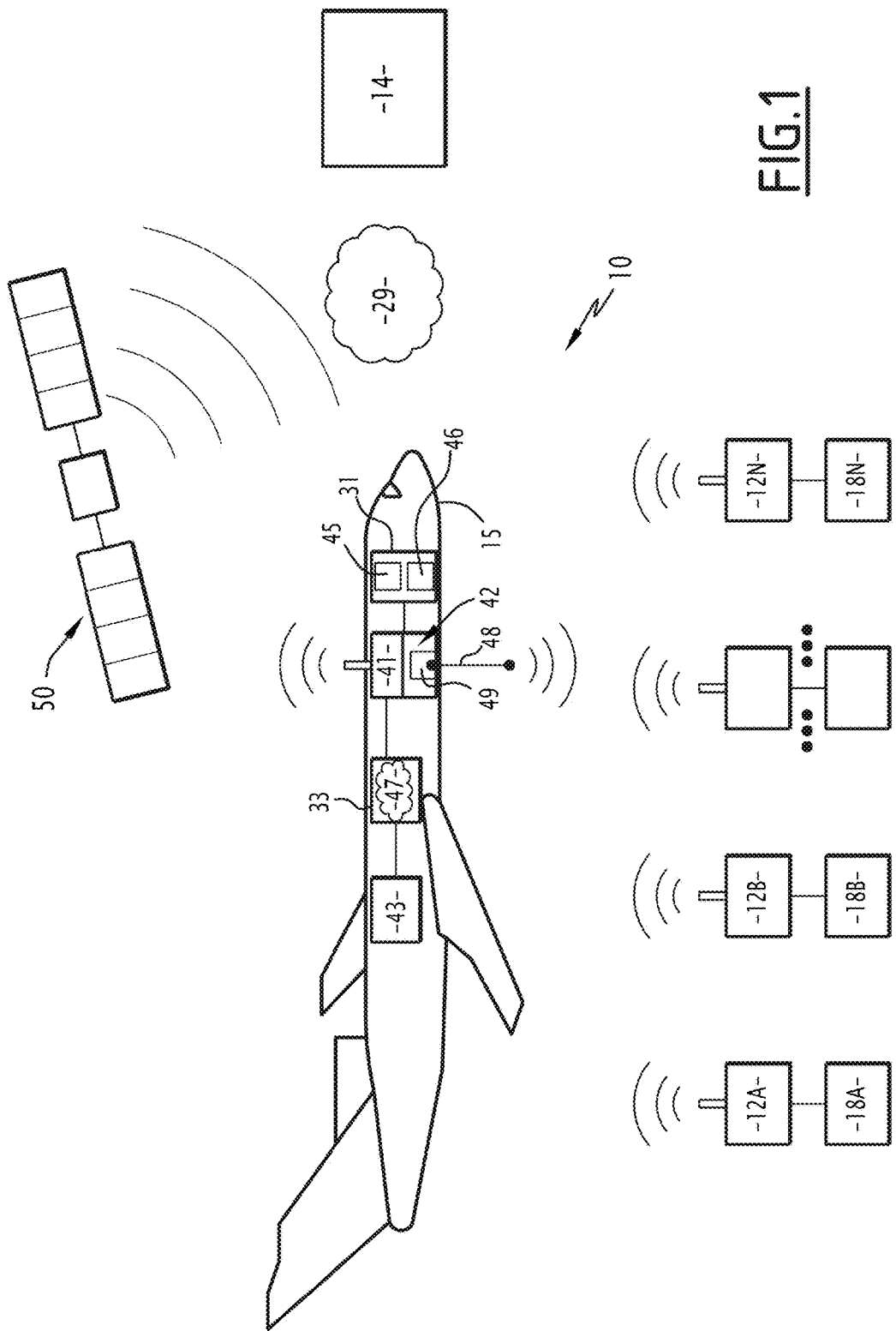
FIG. 1 is a schematic view of an example observation architecture, the observation architecture including an intermediate communication module and a plurality of electronic beacons.

An observation architecture 10 is illustrated in FIG. 1.

The observation architecture enables the remote observation of a plurality of objects arranged in geographically separate locations. The observation architecture 10 more particularly makes it possible to generate observation data relative to each of the objects, collect all of the generated observation data, and analyze the collected observation data in a centralized manner.

Each object is identified in FIG. 1 by a reference sign of type 18*, where "*" is a letter that may vary from A to N. Therefore, according to the example of FIG. 1, fourteen objects are considered, only four being shown for convenience. Of course, depending on the case, other numbers of objects can be considered.

An "object" 18A to 18N refers to a living or nonliving object having at least one physical parameter, remote observation of which is of some interest for scientific, commercial, military, etc. purposes.

One example of such an object 18A to 18N is a predetermined agricultural zone on the ground, the moisture of which is observed for agricultural purposes, or a boat whose position is observed for maritime surveillance purposes.

The objects 18A to 18N are for example arranged on land or in oceans in different geographical locations.

The objects 18A to 18N are arranged to be stationary or able to move in a predetermined mobility zone.

The objects 18A to 18N are of the same nature or different natures.

In the example illustrated in FIG. 1, the observation architecture 10 includes a plurality of electronic beacons, a processing center 14 and an airliner 15.

Each electronic beacon is associated with an object 18A to 18N making it possible to generate at least one observation datum relative to this object 18A to 18N and to send it to the processing center 14.

Each beacon is identified in FIG. 1 by a reference sign of type 12*, where "*" is a letter that may vary from A to N based on the object 18 to 18N with which this beacon 12* is associated.

Each of the electronic beacons 12A to 12N includes an observation unit connected to the corresponding object 18A to 18N, a transmission unit connected to the observation unit and a power source.

In FIG. 2 illustrating the electronic beacon 12A associated with the object 18A, the observation unit is designated by reference 20, the transmission unit by reference 22 and the power source by reference 24.

The electronic beacons 12A to 12N being substantially identical, references 20, 22 and 24 may subsequently be used in relation to any one of the beacons 12A to 12N.

The observation unit 20 is a detector able to generate at least one observation datum relative to the corresponding object 18A to 18N. This observation datum for example comprises a numerical value corresponding to one or several physical parameters observed in relation to this object 18A to 18N.

Thus, for example, for an object 18A to 18N corresponding to an agricultural zone on the ground, the observation unit 20 of the corresponding beacon 12A to 12N comprises a moisture detector able to measure the moisture of this zone and generate an observation datum comprising a numerical value of this measurement.

For an object 18A to 18N corresponding to a boat to be monitored, the observation unit 20 of the corresponding beacon 12A to 12N comprises a detector able to locate the boat from a geolocation system and generate an observation datum for example comprising three numerical values corresponding to the geographical coordinates of this boat.

The transmission unit 22 is a transmitter able to send one or several radio signals corresponding to numerical data.

The transmission unit 22 is more particularly able to send one or several radio signals corresponding to each observation datum generated by the observation unit 20.

The transmission of numerical data by the transmission unit 22 complies with one of the wireless digital data transmission protocols known in itself.

More particularly, this transmission protocol defines several bandwidths for a range for example reaching up to 20 km.

The power source 24 makes it possible to power the corresponding electronic beacon 12A to 12N, and in particular, the observation unit 20 and the transmission unit 22 of this beacon.

The power source 24 is for example a battery cell with a capacity adapted to a life and/or maintenance cycle of the corresponding beacon 12A to 12N.

Alternatively, at least some of the transmission units of the beacons 12A to 12N differ by the transmission protocols and/or the bandwidths used.

The processing center 14 is a centralized processing computer including software for analyzing all of the observation data generated by the set of electronic beacons 12A to 12N.

The observation data are processed using an analysis technique known in itself. This analysis technique in particular depends on the nature of the observed object 18A to 18N.

The processing center 14 is connected to a global computer network 29. The processing center 14 is able to receive observation data generated by the set of electronic beacons 12A to 12N and sent via the global computer network 29 by the airliner 15, as will be explained below.

The global computer network 29 comprises any computer network linking the processing center 14 with one or several computers outside the observation architecture 10.

The global computer network 29 is implemented via one or several ground stations and/or one or several satellites. One example of such a global computer network 29 is the Internet.

According to FIG. 1, the airliner 15 includes a computer 31, a cabin system 33, a first external communication module 41, called first module 41 hereinafter, a second external communication module 42, called second module 42 hereinafter, and an intermediate communication module 43, called intermediate module 43 hereinafter.

The computer 31 includes a memory 45 able to store a plurality of multimedia files and a plurality of software programs, and a processor 46 able to execute at least some of these programs.

The cabin system 33 is for example an in-flight entertainment (IFE) system known in itself. The in-flight entertainment system is in particular usable in airliners to entertain passengers during flights, in particular long flights.

The in-flight entertainment system comprises a local network 47 and a plurality of multimedia terminals connected to the computer 31 by the local network 47.

Each multimedia terminal is for example associated with a passenger to allow him to read multimedia files stored in the memory 45 of the computer 31.

Each multimedia terminal further makes it possible to command the execution of one or several programs stored in the memory 45 of the computer 31.

Additionally, each multimedia terminal is a local computer including connector technology allowing the passenger to connect electronic equipment of the appropriate type, for example a mobile telephone or a laptop computer, to connect this electronic equipment to the local computer network 47.

In the illustrated example, the local network 47 is a multimedia network comprising a wired network allowing the multimedia terminal in particular to access the computer 31 and making it possible, for example, to send multimedia data between the multimedia terminal and the computer 31.

Alternatively, the local network 47 comprises a wireless network for example based on a communication protocol of the Wi-Fi type and allowing the passenger to connect electronic equipment of an appropriate type, for example a mobile telephone or a laptop computer, to at least one multimedia terminal and/or to the computer.

The first module 41 is for example a piece of onboard electronic equipment allowing the airliner 15, and in particular the computer 31, to communicate with the global computer network 29 via radio signals.

More particularly, the first module 41 is connected to the global computer network 29 via a satellite 50 when the airplane 15 is in a coverage zone thereof.

Alternatively or additionally, the first module 41 is connected to the global computer network 29 via land terminals according to one or several communication protocols known in themselves. These protocols for example correspond to those used by mobile telephony according to the 3G or 4G standards.

The first module 41 is able to send and receive digital data via the global computer network 29.

The first module 41 is in particular able to communicate with the processing center 14 via the global computer network 29.

The first module 41 is further connected to the local network 47 to allow the multimedia terminals or any other piece of equipment connected to the local network 47 to connect it with the global computer network 29 at least during certain operating phases of the airliner 15.

The second module 42 is for example a piece of onboard electronic equipment allowing the airliner 15, and in particular the computer 31, to communicate with land or maritime stations via radio signals.

The second module 42 is connected to the local network 47 and includes an antenna 48 and a conversion unit 49.

The antenna 48 defines a visibility domain DVR of the airplane for receiving radio signals in which the antenna 48 is able to receive radio signals.

The antenna 48 further defines a visibility domain DVE of the airplane for transmitting radio signals in which the antenna 48 is able to send radio signals.

The antenna 48 is in particular able to receive radio signals sent by the transmission unit 22 of at least one electronic beacon 12A to 12N found in the receiving visibility domain DVR of the airliner 15.

The antenna 48 is in particular suitable for receiving radio signals sent by the transmission unit 22 of the beacons 12A to 12N according to one or several transmission protocols and/or one or several bandwidths used by the transmission unit 22.

Projected on land, the receiving visibility domain DVR is for example defined by a circle with a diameter for example comprised between 300 and 400 km.

The transmitting visibility domain DVE is for example substantially equal to the receiving visibility domain DVR.

Furthermore, the range of the transmission unit 22 of each of the beacons 12A to 12N is adapted so that the radio signals transmitted by this transmission unit 22 can reach the receiving antenna 48 when the corresponding beacon 12A to 12N is found in the receiving visibility domain DVR of the airliner 15.

The conversion unit 49 makes it possible to convert the received radio signals into digital data and to send this digital data over the local network 47.

The intermediate module 43 makes it possible to collect observation data received by the second module 42 from one or several electronic beacons 12A to 12N and to send the collected observation date to the processing center 14 via the global computer network 29 through the first module 41.

According to the example of FIG. 3, the intermediate module 43 is a laptop computer 51 suitable for being connected to the local network 47.

According to another example embodiment, the intermediate module 43 assumes the form of a software program stored in the memory 45 of the computer 31 and able to be executed by this computer 31. Its execution is for example controlled from a multimedia terminal.

According to FIG. 3, the intermediate module 43 includes a connection unit 52, a processing unit 54 and a control unit 56.

The connection unit 52 makes it possible to connect the intermediate module 43 to the local network 47 via the connector technology of the multimedia terminal or, if applicable, via the Wi-Fi-type protocol.

The connection unit 52 in particular makes it possible to connect the intermediate module 43 to the second module 42 and the first module 41 via the local network 47.

The connection unit 52 is able to receive digital data from the local network 47, and in particular digital data corresponding to observation data sent by the second module 42.

The processing unit 54 is able to process the received observation data, store these observation data, and send them to the first module 41 via the connection unit 52.

The control unit 56 makes it possible to control the operation of the connection unit 52 and the processing unit 54.

A method for collecting observation data implemented by the observation architecture 10 according to the invention will now be described.

During an initial step, each of the beacons 12A to 12N is associated with one of the objects 18A to 18N.

During a following step, the observation unit 20 of each of these beacons 12A to 12N generates one or several observation data relative to the corresponding object 18A to 18N.

During a following step, the transmission unit 22 of each of these beacons 12A to 12N sends a radio signal corresponding to one or several generated observation data.

During a following step, the antenna 48 receives radio signals sent by the beacons 12A to 12N found in the receiving visibility domain DVR of the airliner 15.

The conversion unit 49 converts the received radio signals into digital data to send them to the intermediate module 43 via the local network 47.

During a following step, the intermediate module 43 receives the digital data corresponding to the observation data.

After suitable processing, the observation data are stored in the intermediate module 43.

This processing for example makes it possible to remove any noise that may appear during the transmission of radio signals corresponding to the observation data.

The observation data are temporarily stored in the intermediate module 43, for example to avoid the loss of these data when a connection to the global computer network 29 is not accessible.

During a following step, the intermediate module 43 sends the observation data to the first module 41 via the local network 47.

During a following step, the first module 41 sends the observation data to the processing center 14 via the global computer network 29.

The processing center 14 thus receives the observation data generated by the beacons 12A to 12N situated in the visibility domain of the airplane 15 during its flight, and processes them appropriately.

One can then see that the observation architecture 10 of FIG. 1 includes a certain number of advantages.

The receiving visibility domain DVR of the airplane 15 flying over the beacons 12A to 12N is more restricted than that of the satellite. This makes it possible to greatly decrease the risk of collisions between radio signals emitted by separate beacons 12A to 12N in a same bandwidth.

Furthermore, the requirements regarding the range of radio signals transmitted by the beacons 12A to 12N to an intermediate module 43 onboard an airplane are lower than those regarding the range of radio signals sent to the satellite(s). This then makes it possible to decrease the electricity consumption of the transmission unit 22 and thus increase the life and/or maintenance cycle of the power source 24 of each of the beacons 12A to 12N, in particular when this power source 24 is a battery.

Unlike the existing collection systems, radio signals can be sent between the beacons 12A to 12N and the second external communication module 42 using different transmission protocols and/or bandwidths for different beacons 12A to 12N. The architecture 10 therefore does not involve using beacons implementing a specific or mixed transmission protocol, as was the case in the state of the art.

Lastly, using the local network 47, and in particular its connection to the global computer network 29 already offered by many airlines, makes it possible to minimize the costs related to installing intermediate modules 43 in the airliners 15.

If each of the intermediate modules 43 is also made in the form of a software program, these costs are even lower.

Furthermore, the subscriptions of these intermediate modules 43 to the connection to the global computer network 29 provided by the airlines make it possible to monetize the often substantial costs incurred by these companies to install equipment implementing this connection.

Furthermore, given that the intermediate module 43 is visible by the computer 31 as a simple multimedia terminal or as an entertainment program, its certification onboard the airliner 15 is relatively simple. Thus, in some cases, the certification of only the second external communication module 42 is sufficient.

According to one additional aspect of the invention, at least one of the beacons 12A to 12N, for example the beacons 12B associated with the object 18B and illustrated in more detail in FIG. 4, includes, aside from the observation unit 20, the transmission unit 22 and the power source 24 as previously described, a control unit 60 and a storage unit 61.

The control unit 60 makes it possible to control the operation of the transmission unit 22 of the beacon 12B according to a plurality of predetermined transmission rules.

The transmission rules for example comprise sending one or several observation data in a determined time range, for example, from information relative to a likelihood of passage of the airplane 15 above the beacons 12B or another known location.

Alternatively or additionally, the transmission rules comprise sending one or several observation data at a specific passage time of the airliner 15. This passage time is for example determined according to a passage table stored in the storage unit 61 and known beforehand.

According to still another additional aspect of the invention, at least one of the beacons 12A to 12N, for example the beacon 12C associated with the object 18C and illustrated in more detail in FIG. 5, includes, aside from the observation unit 20, the transmission unit 22, the power source 24 and the control unit 60 as previously described, a receiving unit 62.

The receiving unit 62 allows the electronic beacon 12B to receive radio signals from other land, maritime or airborne stations.

The receiving unit 62 is in particular able to receive radio signals corresponding to at least one transmission setpoint triggering the sending of radio signals corresponding to at least one observation datum by the transmission unit 22.

Thus, the transmission rules of the control unit 60 of this beacon 12C comprise sending one or several observation data after receiving the transmission setpoint.

The transmission setpoint is for example generated by the control unit 56 of the intermediate module 43 and transmitted in the form of radio signals by the antenna 48 in the transmission visibility domain DVE.

Thus, when the beacon 12C is in the transmission visibility domain DVE of the airplane 15, it receives, via its receiving unit 22, the transmission setpoint and sends one or several observation data in response via its transmission unit 62.

This then makes it possible to notify the beacon 12C of the presence of the airplane 15 nearby to subsequently collect one or several observation data.

Additionally, the receiving unit 62 is able to receive radio signals corresponding to control setpoints.

The control setpoints are intended for the control unit 60 and make it possible to modify one or several transmission rules.

The control setpoints are for example generated by the control unit 56 of the intermediate module 43 and transmitted in the form of radio signals by the antenna 48 of the airplane 15.

Alternatively, the transmission and/or control setpoints are generated by any other onboard equipment on the airliner 15 or arranged on the ground near the corresponding beacon 12A to 12N.

The transmission rules thus make it possible to adapt the transmission of radio signals corresponding to observation data to the passage times of the airliner 15. This in particular makes it possible to save electricity supplied by the power source 24.

These transmission rules are programmable and can be modified during the operation of the beacons 12A to 12N.

Figure 6:
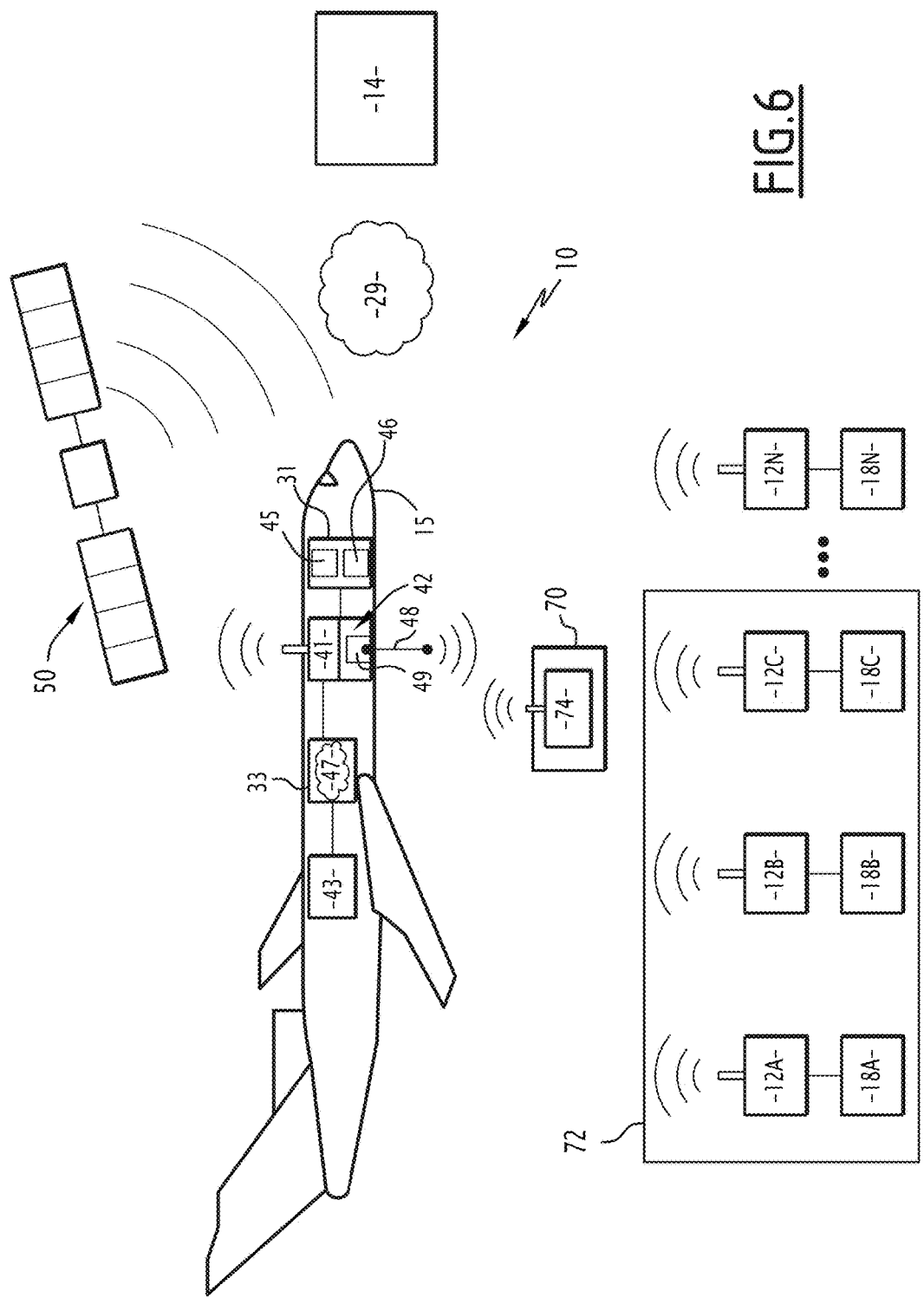
FIG. 6 is a schematic view of another example observation architecture.

Another example of observation architecture 10 is illustrated in FIG. 6. The observation architecture 10 of FIG. 6 is similar to the observation architecture 10 of FIG. 1.

However, unlike the observation architecture 10 of FIG. 1, the observation architecture 10 of FIG. 6 further includes a communication station 70.

This communication station 70 is arranged near a group 72 of beacons 12A to 12C in a fixed or moving manner, and makes it possible to collect the observation data generated by each of the beacons 12A to 12C of this group 72.

The communication station 70 includes a communication unit 74 making it possible to communicate with the beacons 12A to 12C. This in particular makes it possible to reduce the communication range relative to that used by the beacons 12A to 12N of FIG. 1.

The communication unit 74 of the communication station 70 further allows communication with the intermediate communication module 43 of the airplane 15 when the station is in the receiving DVR and transmission DVE visibility domains of the airplane 15.

The method for collecting observation data implemented by the observation architecture 10 of FIG. 6 is similar to that of the observation architecture 10 of FIG. 1.

Indeed, the collection method implemented by the architecture of FIG. 6 further includes a step during which the communication station 70 communicates with each of the beacons 12A to 12N of the group 72 in order to collect the observation data, and a step during which the communication station 70 communicates with the intermediate module 43 to send the collected observation data.

Of course, other observation architecture 10 examples are also possible.

Thus, according to one example embodiment, the observation architecture 10 includes a plurality of airliners each including an intermediate module 43.

According to this example embodiment, it is possible to ensure the visibility of each of the beacons 12A to 12N by at least one of the airliners 15 continuously, or at least during a significant time range that may reach up to 12 hours per day.

Of course, when the number of airliners equipped with an intermediate module 16 increases, the likelihood of losing observation data sent by the beacons 12A to 12N decreases, which makes the operation of the observation architecture 10 more efficient.

The invention claimed is:

1. An architecture for observing a plurality of objects arranged in geographically separate locations, including:
   for each object, an electronic beacon including an observation unit generating at least one observation datum relative to the corresponding object, and a transmission unit sending a radio signal corresponding to at least one generated observation datum,
   a processing center connected to a global computer network,
   at least one airliner, including:
   a cabin system including a local network,
   a first external communication module communicating with the processing center via the global computer network, a second external communication module defining a visibility domain of the airliner for receiving and sending radio signals, and receiving from at least one electronic beacon found in the visibility domain of the airliner, at least one radio signal corresponding to at least one observation datum, and an intermediate communication module connected to the first external communication module by the local network and to the second external communication module by the local network, the intermediate communication module communicating digital data comprising observation data between the second external communication module and the first external communication module via the local network.

2. The architecture according to claim 1, wherein the intermediate communication module communicating with the second external communication module to collect each received observation datum, and with the first external communication module to send all of the collected observation data to the processing center via the global computer network.

3. The architecture according to claim 1, wherein:
the airliner further includes a computer ; and
the intermediate communication module is software executed by the computer.

4. The architecture according to claim 1, wherein the cabin system is an in-flight entertainment system and wherein the local network is a local multimedia network sending multimedia data, and wherein:
the in-flight entertainment system further includes at least one multimedia terminal connected to the local multimedia network,
the intermediate communication module is software executed from the at least one multimedia terminal.

5. The architecture according to claim 1, wherein the intermediate communication module is a portable computer including connector technology for connecting to the local network.

6. The architecture according to claim 1, wherein the at least one electronic beacon includes a control unit controlling the operation of the transmission unit according to a plurality of predetermined transmission rules.

7. The architecture according to claim 6, wherein:
the at least one electronic beacon further includes a storage unit storing a passage table comprising at least one time range within which the corresponding electronic beacon is found in the visibility domain of the airliner,
the transmission rules comprise sending at least one radio signal corresponding to at least one observation datum in at least one time range determined by the passage table.

8. The architecture according to claim 6, wherein:
the at least one electronic beacon further includes a receiving unit able to receive at least one radio signal corresponding to a transmission setpoint, and the transmission rules comprise sending at least one radio signal corresponding to an observation datum after receiving the transmission setpoint.

9. The architecture according to claim 8, wherein the radio signal corresponding to a transmission setpoint is sent by the second external communication module in the visibility domain of the airliner.

10. The architecture according to claim 6, wherein:
the at least one electronic beacon further includes a receiving unit receiving at least one radio signal corresponding to a control setpoint, and
the control unit is processing the control setpoint received by the receiving unit to modify at least certain transmission rules.

11. The architecture according to claim 10, wherein the radio signal corresponding to a control setpoint is sent by the second external communication module in the visibility domain of the airliner.

12. The architecture according to claim 1, further including a communication station communicating with a group of electronic beacons to collect observation data generated by each of the electronic beacons in the group, the intermediate communication module being able to communicating with the communication station to collect the observation data collected by the communication station.

13. The architecture according to claim 1, wherein the first external communication module is connected to the global computer network via one or several satellites.

14. The architecture according to claim 1, wherein:
each transmission unit sending radio signals according to a predetermined transmission protocol according to at least one bandwidth, and
at least certain transmission protocols and/or bandwidths used by different transmission units are different.

15. A method for collecting observation data implemented by the observation architecture according to claim 1, including the following steps:
the observation unit generates an observation datum from at least one electronic beacon found in the visibility domain of the airliner,
the corresponding transmission unit sends at least one radio signal corresponding to the observation datum,
the second external communication module receives at least one radio signal,
the received radio signal is converted into the corresponding observation datum and the observation datum is sent to the intermediate communication module via the local network,
the observation datum is sent to the first external communication module by the intermediate communication module via the local network, and
the observation datum is sent to the processing center by the first external communication module via the global computer network.

* * * * *